United States Patent
Ferguson et al.

(10) Patent No.: US 10,320,958 B2
(45) Date of Patent: Jun. 11, 2019

(54) FAST DATA TRANSFER COMMUNICATION PROTOCOL FOR AN INDUSTRIAL PROCESS NETWORK

(71) Applicant: Emerson Process Management LLLP, Eden Prairie, MN (US)

(72) Inventors: Anthony Dean Ferguson, Minnetrista, MN (US); Brian Alan Franchuk, Richfield, MN (US); Thomas Marvin Bell, Lakeville, MN (US)

(73) Assignee: Emerson Process Management LLLP, Shakopee, MN (US)

( * ) Notice: Subject to any disclaimer, the term of this patent is extended or adjusted under 35 U.S.C. 154(b) by 440 days.

(21) Appl. No.: 14/576,751

(22) Filed: Dec. 19, 2014

(65) Prior Publication Data
US 2016/0182693 A1    Jun. 23, 2016

(51) Int. Cl.
H04L 12/18    (2006.01)
H04L 29/06    (2006.01)
H04L 29/08    (2006.01)

(52) U.S. Cl.
CPC .......... *H04L 69/26* (2013.01); *H04L 12/1868* (2013.01); *H04L 67/12* (2013.01)

(58) Field of Classification Search
CPC ...... H04L 69/26; H04L 12/1868; H04L 67/12
See application file for complete search history.

(56) References Cited

U.S. PATENT DOCUMENTS 5,396,494 A * 3/1995 Roposh ............... H04L 12/40
                                                    370/439
6,321,272 B1 * 11/2001 Swales ............... G05B 19/4185
                                                    709/223
7,013,184 B2    3/2006 Romagnoli et al.
(Continued)

FOREIGN PATENT DOCUMENTS

KR    20000051286 A    8/2000

OTHER PUBLICATIONS

International Search Report and Written Opinion from PCT Application Serial No. PCT/US2015/058776, dated Feb. 25, 2016, 15 pages.

(Continued)

*Primary Examiner* — Philip J Chea
*Assistant Examiner* — Robert B McAdams
(74) *Attorney, Agent, or Firm* — Kinney & Lange, P.A.

(57) ABSTRACT

A method of transferring data between a host device and a field device on an industrial process network includes transmitting, by the host device to the field device, a fast data transfer initiate request to request a subsequent data transfer between the host device and the field device via a fast data transfer communication protocol. The method further includes receiving, by the host device from the field device, a fast data transfer confirmation indicating, and transmitting, by the host device to the field device, a generic data transfer initiate request to request the subsequent data transfer with the field device. The method further includes receiving, by the host device from the field device, a generic data transfer (Continued)

initiate confirmation, and executing, responsive to the generic data transfer initiate confirmation, the subsequent data transfer between the host device and the field device via the fast data transfer protocol.

13 Claims, 6 Drawing Sheets

(56) References Cited

U.S. PATENT DOCUMENTS

| | | | |
|---|---|---|---|
| 7,984,199 B2* | 7/2011 | Ferguson | G06F 8/60 709/220 |
| 2002/0194365 A1* | 12/2002 | Jammes | H04L 12/24 709/237 |
| 2004/0213285 A1 | 10/2004 | Stevenson et al. | |
| 2005/0058152 A1 | 3/2005 | Oksanen et al. | |
| 2008/0273486 A1 | 11/2008 | Pratt et al. | |
| 2009/0228611 A1 | 9/2009 | Ferguson et al. | |
| 2010/0077111 A1* | 3/2010 | Holmes | H04L 67/12 710/33 |
| 2010/0217894 A1* | 8/2010 | Papenfort | G05B 19/0421 710/15 |
| 2014/0121785 A1 | 5/2014 | Ismail et al. | |

OTHER PUBLICATIONS

International Preliminary Report on Patentability for PCT Application No. PCT/US2015/058776, dated Jun. 20, 2017, 10 pages.
Extended European Search Report for European Patent Application No. 15870540.0, dated May 4, 2018, 12 pages.

* cited by examiner

FAST DATA TRANSFER COMMUNICATION PROTOCOL FOR AN INDUSTRIAL PROCESS NETWORK

BACKGROUND

The present disclosure relates generally to data transfer on an industrial process network. More particularly, the present disclosure relates to a fast data transfer communication protocol between devices on the industrial process network.

In a typical industrial plant, a distributed control system (DCS) is used to control many of the industrial processes performed at the plant. Typically, the plant has a centralized control room having a computer system with user input/output (I/O), disc I/O, and other peripherals. Coupled to the computer system are a controller and a process I/O subsystem. The process I/O subsystem includes I/O ports, which are connected to various field devices throughout the plant. Field devices include various types of analytical equipment, such as pressure sensors, temperature sensors, switches, transducers, valve positioners and actuators, as well as any other device that performs a function in a distributed control system.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to a sensed process variable. On the other hand, an analog field device that performs an action under control of the control room is controlled by the magnitude of the current through the loops, which is modulated by the I/O port of the process I/O system, which in turn is controlled by the controller.

Historically, most traditional field devices have had either a single input or a single output that was directly related to the primary function performed by the field device. For example, often the only function implemented by a traditional analog resistive temperature sensor is to transmit a temperature by modulating the current flowing through the two-wire twisted pair, while the only function implemented by a traditional analog valve positioner is to position a valve between an open and closed position based on the magnitude of the current flowing through the two-wire twisted pair.

More recently, hybrid systems that superimpose digital data on the current loop have been used in process control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device identification information, materials of construction, configuration or programming information, or other types of information. Accordingly, a single hybrid field device may have a variety of input and output variables and may implement a variety of functions.

Foundation Fieldbus is a multi-drop serial digital two-way communications protocol defined by the Instrument Society of America (ISA), and is intended for connecting field instruments and other process devices (e.g., monitoring and simulation units) in distributed control systems. Foundation Fieldbus allows enhanced digital communication over previous process control loop methods while maintaining the ability to power process devices coupled to the Fieldbus loop and while meeting intrinsic safety requirements. For instance, the Foundation Fieldbus specification (i.e., including the physical layer specification and the data link layer specification) defines networks that transmit data at much higher data rates than traditional hybrid systems, such as at data rates up to 31.25 kilobits per second (Kbps) for an H1 Fieldbus network and data rates up to 2.5 megabits per second (Mbps) for an H2 Fieldbus network.

The Fieldbus Message Specification (FMS) defines a messaging protocol for communications over the fieldbus, accomplished via Virtual Communication Relationships (VCRs). The VCRs provide connection-based channels for the transfer of data between applications and/or devices. Devices on the fieldbus network communicate via both scheduled and unscheduled communications managed by a Link Master (LM) device that is designated as the Link Active Scheduler (LAS). During scheduled communications, the LAS device issues a compel data message to a field device. In response, the field device publishes data over the network to one or more subscriber devices. Unscheduled communications are accomplished via a token passing algorithm managed by the LAS device. The LAS device issues a pass token message in turn to each device included in a list of active devices on the network, often referred to as the live list. Upon receiving the pass token message, a field device transmits any unscheduled data until all of its data has been published or a configurable "maximum token hold time" has expired.

Due to the connection-based nature of the VCRs, data transmissions are accomplished via a series of messages, each requiring a corresponding acknowledgment. Unacknowledged messages are retransmitted, thereby increasing robustness of communications. However, such connection-based transactions introduce overhead to the communications scheme, which is time-limited by the maximum token hold time allotted to each device for unscheduled communications. Accordingly, transactions involving large amounts of data, such as uploads and downloads of configuration data and/or software images can be relatively slow, sometimes taking an hour or more to complete the transaction. As such, the use of connection-based transactions can increase the time (and expense) associated with activities such as maintenance, debugging, and device commissioning, and thereby generally decreasing usability of the system.

SUMMARY

In one example, a method of transferring data between a host device and a field device on an industrial process network includes transmitting, by the host device to the field device, a fast data transfer initiate request to request a subsequent data transfer between the host device and the field device via a fast data transfer communication protocol. The method further includes receiving, by the host device from the field device, a fast data transfer confirmation indicating that the field device is configured for the subsequent data transfer via the fast data transfer communication protocol, and transmitting, by the host device to the field device, a generic data transfer initiate request to request the subsequent data transfer with the field device. The method further includes receiving, by the host device from the field device, a generic data transfer initiate confirmation indicating that the field device is configured for the subsequent data transfer, and executing, responsive to the generic data transfer initiate confirmation, the subsequent data transfer between the host device and the field device via the fast data transfer protocol.

In another example, a method of transferring data between a host device and a field device on an industrial process network includes receiving, by the field device from the host device, a fast data transfer initiate request to request a subsequent data transfer between the host device and the field device via a fast data transfer communication protocol. The method further includes transmitting, by the field device to the host device, a fast data transfer initiate confirmation indicating that the field device is configured for the subsequent data transfer via the fast data transfer communication protocol, and receiving, by the field device from the host device, a generic data transfer initiate request to request the subsequent data transfer with the field device. The method further includes transmitting, by the field device to the host device, a generic data transfer initiate confirmation indicating that the field device is configured for the subsequent data transfer, and executing, responsive to the generic data transfer initiate confirmation, the subsequent data transfer between the host device and the field device via the fast data transfer communication protocol.

In one example, a host device includes at least one processor, one or more storage devices, and a transceiver configured to send and receive data over an industrial process control network. The one or more storage devices are encoded with instructions that, when executed by the at least one processor, cause the host device to transmit, to a field device via the transceiver, a fast data transfer initiate request to request a subsequent data transfer between the host device and the field device via a fast data transfer communication protocol. The one or more storage devices are further encoded with instructions that, when executed by the at least one processor, cause the host device to receive, from the field device via the transceiver, a fast data transfer confirmation indicating that the field device is configured for the subsequent data transfer via the fast data transfer communication protocol, and transmit, to the field device via the host transceiver, a generic data transfer initiate request to request the subsequent data transfer with the field device. The one or more storage devices are further encoded with instructions that, when executed by the at least one processor, cause the hose device to receive, from the field device via the host transceiver, a generic data transfer initiate confirmation indicating that the field device is configured for the subsequent data transfer, and execute, responsive to receiving the generic data transfer initiate confirmation from the field device, the subsequent data transfer with the field device via the fast data transfer communication protocol.

In one example, a field device includes at least one processor, one or more storage devices, and a transceiver configured to send and receive data over an industrial process control network. The one or more storage devices are encoded with instructions that, when executed by the at least one processor, cause the field device to receive, from the host device via the transceiver, a fast data transfer initiate request to request a subsequent data transfer between the host device and the field device via a fast data transfer communication protocol. The one or more storage devices are further encoded with instructions that, when executed by the at least one processor, cause the field device to transmit, to the host device via the transceiver, a fast data transfer initiate confirmation indicating that the field device is configured for the subsequent data transfer via the fast data transfer communication protocol, and receive, from the host device via the transceiver, a generic data transfer initiate request to request the subsequent data transfer with the field device. The one or more storage devices are further encoded with instructions that, when executed by the at least one processor, cause the field device to transmit, to the host device via the transceiver, a generic data transfer initiate confirmation indicating that the field device is configured for the subsequent data transfer, and execute, responsive to transmitting the generic data transfer initiate confirmation, the subsequent data transfer between the host device and the field device via the fast data transfer communication protocol.

In one example, an industrial process system includes a host device and a field device. The host device includes at least one processor, one or more host storage devices, and a host transceiver configured to send and receive data over an industrial process network. The one or more host storage devices are encoded with instructions that, when executed by the at least one host processor, cause the host device to transmit, to the field device via the host transceiver, a fast data transfer initiate request to request a subsequent data transfer between the host device and the field device via a fast data transfer communication protocol. The one or more host storage devices are further encoded with instructions that, when executed by the at least one host processor, cause the host device to receive, from the field device via the host transceiver, a fast data transfer confirmation indicating that the field device is configured for the subsequent data transfer via the fast data transfer communication protocol, and transmit, to the field device via the host transceiver, a generic data transfer initiate request to request the subsequent data transfer with the field device. The one or more host storage devices are further encoded with instructions that, when executed by the at least one host processor, cause the host device to receive, from the field device via the host transceiver, a generic data transfer initiate confirmation indicating that the field device is configured for the subsequent data transfer, and execute, responsive to receiving the generic data transfer initiate confirmation from the field device, the subsequent data transfer with the field device via the fast data transfer communication protocol. The field device includes at least one field device processor, one or more field device storage devices, and a field device transceiver configured to send and receive data over the industrial process network. The one or more field device storage devices are encoded with instructions that, when executed by the at least one field device processor, cause the field device to receive, from the host device via the field device transceiver, the fast data transfer initiate request. The one or more field device storage devices are further encoded with instructions that, when executed by the at least one field device processor, cause the field device to transmit, to the host device via the field device transceiver, the fast data transfer confirmation, and receive, from the host device via the field device transceiver, the generic data transfer initiate request. The one or more field device storage devices are further encoded with instructions that, when executed by the at least one field device processor, cause the field device to transmit, to the host device via the field device transceiver, the generic download initiate confirmation, and execute, responsive to transmitting the generic download initiate confirmation, the subsequent data transfer with the host device via the fast data transfer protocol.

DETAILED DESCRIPTION

According to techniques of this disclosure, data transfers between a host device and one or more field devices on a Foundation Fieldbus network can be accomplished via a fast data transfer communication protocol. Rather than transfer data via a connection-based communication session, such as a virtual communication relationship (VCR), a system implementing techniques of this disclosure can broadcast data (e.g., upload and/or download data) between the host device and field device using a connectionless (e.g., broadcasting) communication protocol. By broadcasting the messages, rather than requiring acknowledgment of receipt via a connection-based session, the techniques can increase the speed of data transmissions, as well as decrease the amount of data traffic on the fieldbus network. Moreover, a broadcasted message can be received by multiple devices (e.g., multiple field devices), thereby decreasing the number of data transmissions necessary to communicate a same set of data to multiple devices. In some examples, a data receiver (e.g., a field device during data download, or a host device during data upload) can utilize domain positioning information included in the messages to determine whether a transmitted message was not received. In such examples, the data receiver can request retransmission of the missed message, thereby enabling a more robust communication session. Accordingly, a system implementing techniques of this disclosure can increase the speed and efficiency of data transmissions over a Foundation Fieldbus network.

Figure 1:
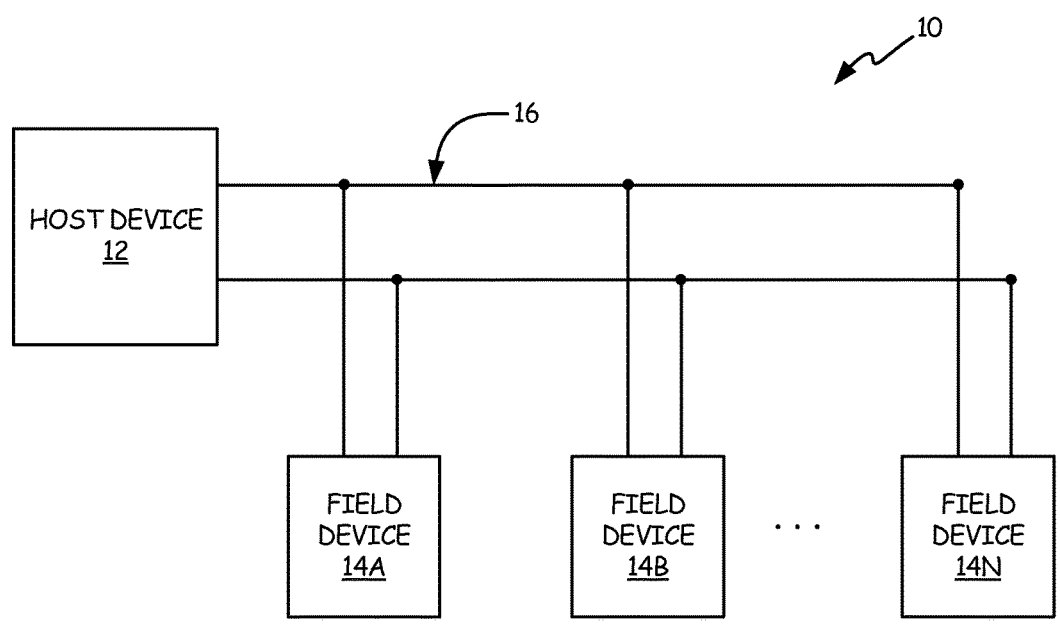
FIG. 1 is a block diagram illustrating an industrial process network including a host device and field devices that can implement a fast data transfer communication protocol.

FIG. 1 is a block diagram illustrating one embodiment of an industrial process network 10 that includes host device 12 and field devices 14A-14N (collectively referred to herein as "field devices 14") that can implement a fast data transfer communication protocol. Although network 10 will be described in the context of a process control/monitoring system using Foundation Fieldbus communication protocol with communication of messages over bus 16, techniques of this disclosure may have general applicability to digital networks having host and/or field devices that engage in message transactions.

Host device 12 may typically be located within a centralized control room in an industrial process plant. In other examples, host device 12 can be a handheld device that can be attached and detached from bus 16 at various locations. Bus 16 can be, for example, a two-wire twisted pair or a four-wire cable that provides a communication pathway over which messages can be sent. Bus 16 can support a plurality of devices on a single cable, although the number of devices on bus 16 may be based at least in part on a target loop execution speed and/or intrinsic safety requirements. Accordingly, field devices 14 are illustrated and described with respect to the example of FIG. 1 as including "N" field devices, where "N" represents an arbitrary number.

Host device 12 may typically act as a link active scheduler (LAS) of network 10. In its function as the LAS device, host device 12 maintains a central schedule for all communications between devices on bus 16. At least one of the other devices in network 10 (e.g., one or more of field devices 14) can be configured to act as a link master (LM) device. An LM device can be configured to take over scheduling responsibilities of the LAS device should the LAS device fail or become inoperable. In some examples, more than one LM device can be present on bus 16, thereby providing further backup for scheduling responsibilities.

Field devices 14, in some examples, can be process instruments that sense one or more process parameters and provide data based upon the sensed parameters. In certain examples, field devices 14 can be process actuators that provide a physical output based upon a command message received, e.g., over bus 16. In some examples, one or more of field devices 14 can be process instruments and one or more of field devices 14 can be process actuators. In certain examples, one or more of field devices 14 can include both sensing and actuating capabilities. Examples of field devices 14 include, but are not limited to, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights.

As one example operation, host device 12 can act as a LAS device for network 10, thereby maintaining a central schedule for communications between any one or more of host device 12 and field devices 14 over bus 16. Host device 12 can initiate scheduled communications with field devices 14, such as by transmitting compel data messages to field devices 14, in turn, over bus 16 according to the central schedule. In response to receiving a compel data message, the respective one of field devices 14 can transmit its scheduled communications data over bus 16. Scheduled communications data can include, for example, process variable data sensed by the respective field device and used for control of the industrial process. As another example, scheduled communications data can include actuator state information (e.g., position information) of the respective one of field devices 14. In general, scheduled communications data can typically include data identified as critical to real-time operation and control of the industrial process network, such as data used by function blocks executing on field devices 14 to monitor and/or control operation of the industrial process.

As one example, host device 12 can transmit a compel data message to field device 14A at a time identified by the central schedule for scheduled communications with field device 14A. In response to receiving the compel data message, field device 14A can transmit its scheduled communications data over bus 16, such as process parameter data sensed by field device 14A (e.g., temperature data, pressure data, or other types of process parameter data). The transmitted data can be received by one or more of host device 12 and field devices 14B-14N (i.e., others of field devices 14) that are configured to receive data transmissions from field device 14A, often referred to as "subscriber" devices. Host device 12 can transmit compel data messages to each of field devices 14 that are included in a live list of devices (i.e., a list of field devices 14 configured to transmit data over bus 16) according to the schedule, thereby managing scheduled communications over bus 16 in a deterministic manner.

Host device 12 can further initiate unscheduled communications with field devices 14 via a token passing algorithm. According to the token passing algorithm, host device 12 can transmit a "pass token" message to each of field devices 14, in turn, to initiate unscheduled data transmissions from the respective field device. Unscheduled data transmissions can include, for instance, configuration data, alarm data, event data, trend data, diagnostic data, status data, data for operator displays, or other types of data. In general, unscheduled data can include any data not identified as critical to real-time operation of the industrial process network, such as data that is not used by function blocks executing on field devices 14 to monitor and/or control operation of the industrial process.

As an example, host device 12 can transmit a pass token message over bus 16 to field device 14A. Field device 14A, in response to receiving the pass token message, can transmit any unscheduled data identified (e.g., queued) by field device 14A for transmission over bus 16. Field device 14A can transmit the unscheduled data until all of the unscheduled data identified for transmission has been transmitted over bus 16, or until a configurable "maximum token hold time" has elapsed. The maximum token hold time parameter can effectively define an unscheduled data transmission time window within which field devices 14 can transmit unscheduled data. In some examples, each of field devices 14 can be configured with a same maximum token hold time, thereby defining a same length of time for unscheduled data transmissions for each of field devices 14. In other examples, one or more of field devices 14 be configured with different maximum token hold times.

In examples where the maximum token hold time elapses prior to a complete transmission of the unscheduled data, field device 14A can store (e.g., queue) the unsent data for later transmission, such as during the next unscheduled data transmission window. In examples where field device 14A transmits all of its unscheduled data prior to expiration of the maximum token hold time, field device 14A can transmit a token return message to host device 12 to indicate that it has completed its unscheduled data transmission. Host device 12 can transmit a pass token message to each of field devices 14, respectively, which can each transmit unscheduled data over bus 16 as described with respect to field device 14A. In this way, host device 12 can manage unscheduled data communications of field devices 14.

Scheduled and/or unscheduled communications over bus 16 can be accomplished via VCRs between any one or more of host device 12 and field devices 14. The VCRs provide connection-based channels for the transfer of data between devices on bus 16. Any one or more of host device 12 and field devices 14 can exchange data using the VCRs via messages having a format defined by the Fieldbus Message Specification (FMS). FMS messages transmitted via the connection-based VCRs include a message payload as well as overhead in the form of a message preamble, a start delimiter, a stop delimiter, and other meta data associated with the message. FMS messages transmitted via the connection-based VCRs are acknowledged with a corresponding acknowledgement message from the receiving device, thereby indicating that the message was received. Unacknowledged messages can be retransmitted, thereby increasing robustness of system communications.

In some examples, unscheduled data transmissions can include an amount of data that exceeds a maximum defined size of a corresponding FMS message. In such examples, the data can be transmitted via a plurality of FMS messages, each including an associated message preamble and other message overhead and requiring a corresponding acknowledgment from a receiving device. For instance, device configuration data and/or software image data (i.e., a set of computer-readable instructions executable by the device for operation of the device) can often span multiple FMS messages. In some cases, the amount of time to transmit the data can exceed a maximum token hold time allotted to the device, thereby causing the data to be transmitted across multiple unscheduled data transmission windows.

Accordingly, as described herein, one or more of host device 12 and field devices 14 can exchange data over bus 16 via a fast data transfer communication protocol. For instance, as is further described below, rather than transfer data via the connection-based VCR that includes corresponding acknowledgments for each transmitted message, one or more of host device 12 and field devices 14 can broadcast data using a connectionless communication protocol.

As one example operation, host device 12 can transmit, via a VCR established between host device 12 and field device 14A, a fast data transfer initiate request to request a subsequent data transfer between host device 12 and field device 14A via the fast data transfer communication protocol. Field device 14A, responsive to receiving the fast data transfer initiate request, can transmit a fast data transfer confirmation to host device 12 via the VCR, the confirmation indicating that field device 14A is configured for the subsequent data transfer via the fast data transfer communication protocol. Responsive to receiving the confirmation, host device 12 can transmit, via the VCR, a generic data transfer initiate request to request the subsequent data transfer with the field device. The generic data transfer initiate request can, in certain examples, be a data transfer initiate request defined by the FMS. One or more of the fast data transfer initiate request and the generic data transfer initiate request can include a broadcast network address, such as a network address of an I/O port of host device 12 configured to receive broadcast network communications. Field device 14A can transmit a generic data transfer initiate confirmation via the VCR confirming that field device 14A is configured for the subsequent data transfer. Responsive to receiving the generic data transfer initiate confirmation, host device 12 and field device 14A can execute the subsequent data transfer via the fast data transfer protocol. For instance, executing the subsequent data transfer via the fast data transfer protocol can include broadcasting the subsequent data transfer to the identified broadcast network address (e.g., the address included in one or more of the fast data transfer and generic data transfer initiate requests). In certain examples, broadcasting the subsequent data transfer to the identified broadcast network address can include broadcasting a plurality of messages to the broadcast network address without receiving an acknowledgment including an indication of whether any one of the plurality of messages was received.

As such, host device 12 and field devices 14 can implement a fast data transfer communication protocol to transfer data via bus 16 without requiring acknowledgment of individual messages. In this way, host device 12 and field devices 14 can transfer large amounts of data, such as configuration data and/or software image data, more quickly than could otherwise be transferred via connection-based VCRs and corresponding FMS messages. Accordingly, techniques of this disclosure can decrease an amount of time (and associated expense) associated with such large-scale data transfers, such as during device commissioning, device maintenance, debugging, or other activities.

Figure 2:
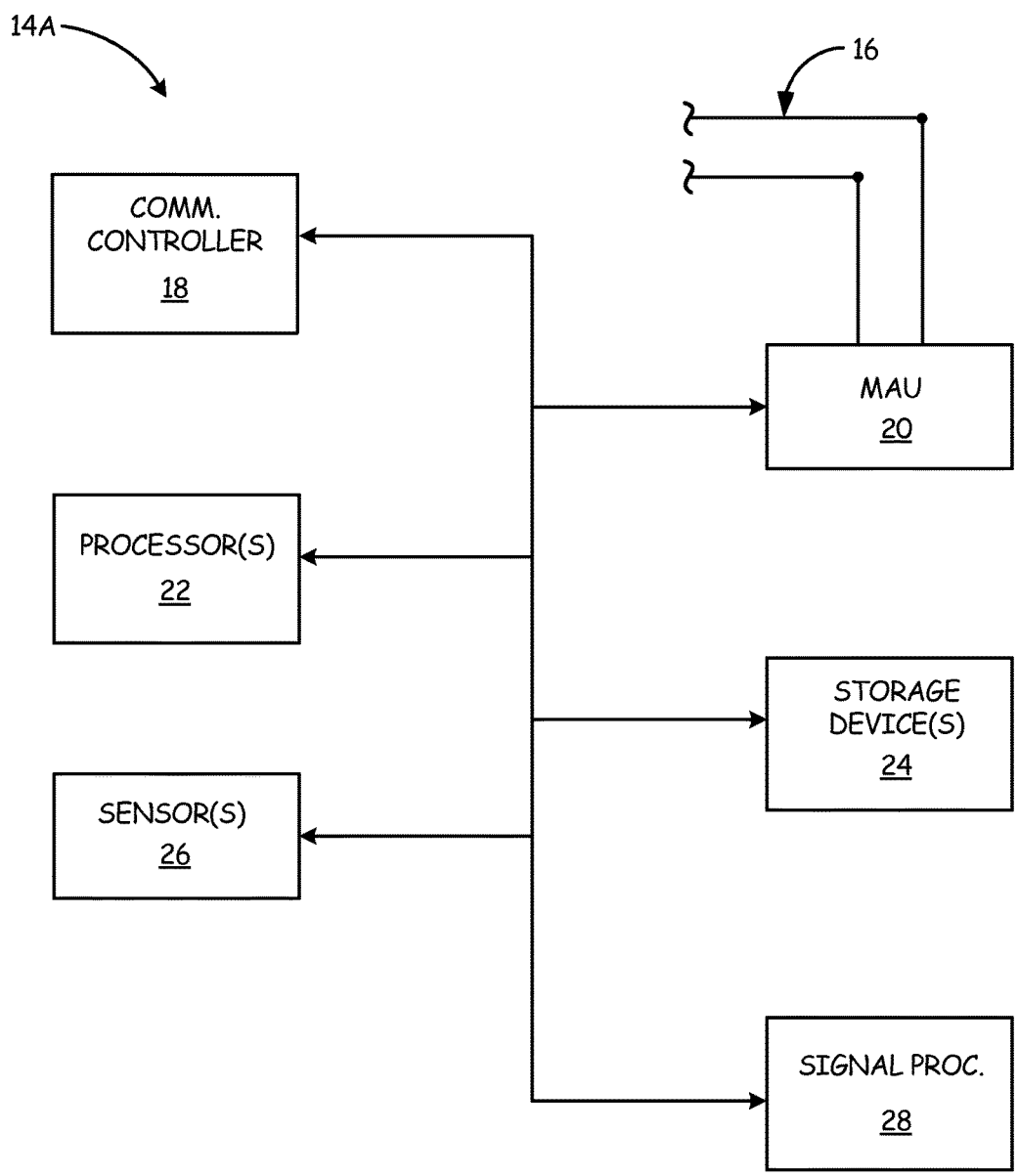
FIG. 2 is a block diagram of a field device.

FIG. 2 is a block diagram of one embodiment of field device 14A of FIG. 1. However, while illustrated and described with respect to field device 14A, it should be understood that field devices 14 of FIG. 1 can be substantially similar, such that field device 14A of FIG. 2 can be any of field devices 14.

As illustrated in FIG. 2, field device 14A can include communications controller 18, medium attachment unit (MAU) 20, processor(s) 20, storage device(s) 24, sensor(s) 26, and signal processing circuitry 28. Sensor 26 can sense one or more process parameters or variables and provide corresponding sensor signals to signal processing circuitry 28. The sensor signals can include a primary variable (e.g., pressure) and a secondary variable (e.g., temperature). The secondary variable can be used by processor 22, in some examples, for correction or compensation of the sensor signal representing the primary variable.

Signal processing circuitry 28 typically includes analog-to-digital conversion circuitry, as well as filtering and other signal processing to place the sensor signals into a format that can be used by processor 22. For example, signal processing circuitry 28 can include any one or more sigma delta analog-to-digital converters and digital filters to provide digitized and filtered sensor signals to processor 22.

Processor 22, in one example, is configured to implement functionality and/or process instructions for execution within field device 14A, such as to coordinate the operation of field device 14A. For example, processor 22 can process instructions stored in storage device 24 to process data received over bus 16, receive and store sensor signals generated by sensor 26 (e.g., within storage device 24), and create and select data to be contained in messages that are transmitted from field device 14A over bus 16. Examples of processor 22 can include any one or more of a microprocessor, a controller, a digital signal processor (DSP), an application specific integrated circuit (ASIC), a field-programmable gate array (FPGA), or other equivalent discrete or integrated logic circuitry.

Storage device 24 can be configured to store information within field device 14 during operation. Storage device 24, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device 24 is not long-term storage. Storage device 24, in some examples, is described as a volatile memory, meaning that storage device 24 does not maintain stored contents when power to field device 14A is turned off. Examples of volatile memories can include random access memories (RAM), dynamic random access memories (DRAM), static random access memories (SRAM), and other forms of volatile memories. In some examples, storage device 24 is used to store program instructions for execution by processor 22. Storage device 24, in one example, is used by software, firmware, or other application logic executing on processor 22 to temporarily store information during program execution.

Storage device 24, in some examples, also includes one or more computer-readable storage media. Storage device 24 can be configured to store larger amounts of information than volatile memory. Storage device 24 can further be configured for long-term storage of information. In some examples, storage device 24 includes non-volatile storage elements. Examples of such non-volatile storage elements can include magnetic hard discs, optical discs, floppy discs, flash memories, or forms of electrically programmable memories (EPROM) or electrically erasable and programmable memories (EEPROM).

Communications controller 18 can serve as an interface between processor 22 and MAU 20. For example, communications controller 18, which can be an ASIC, can receive data from MAU 20, decode the data, form the data into bytes, and provide message data to be read by processor 22. As another example, communications controller 18 can receive bytes of data from processor 22, format the data into messages, and provide messages to MAU 20 for transmission on bus 16. MAU 20 can provide network connection of field device 14A to bus 16. MAU 20 can be an integrated circuit or discrete components.

Figure 3:
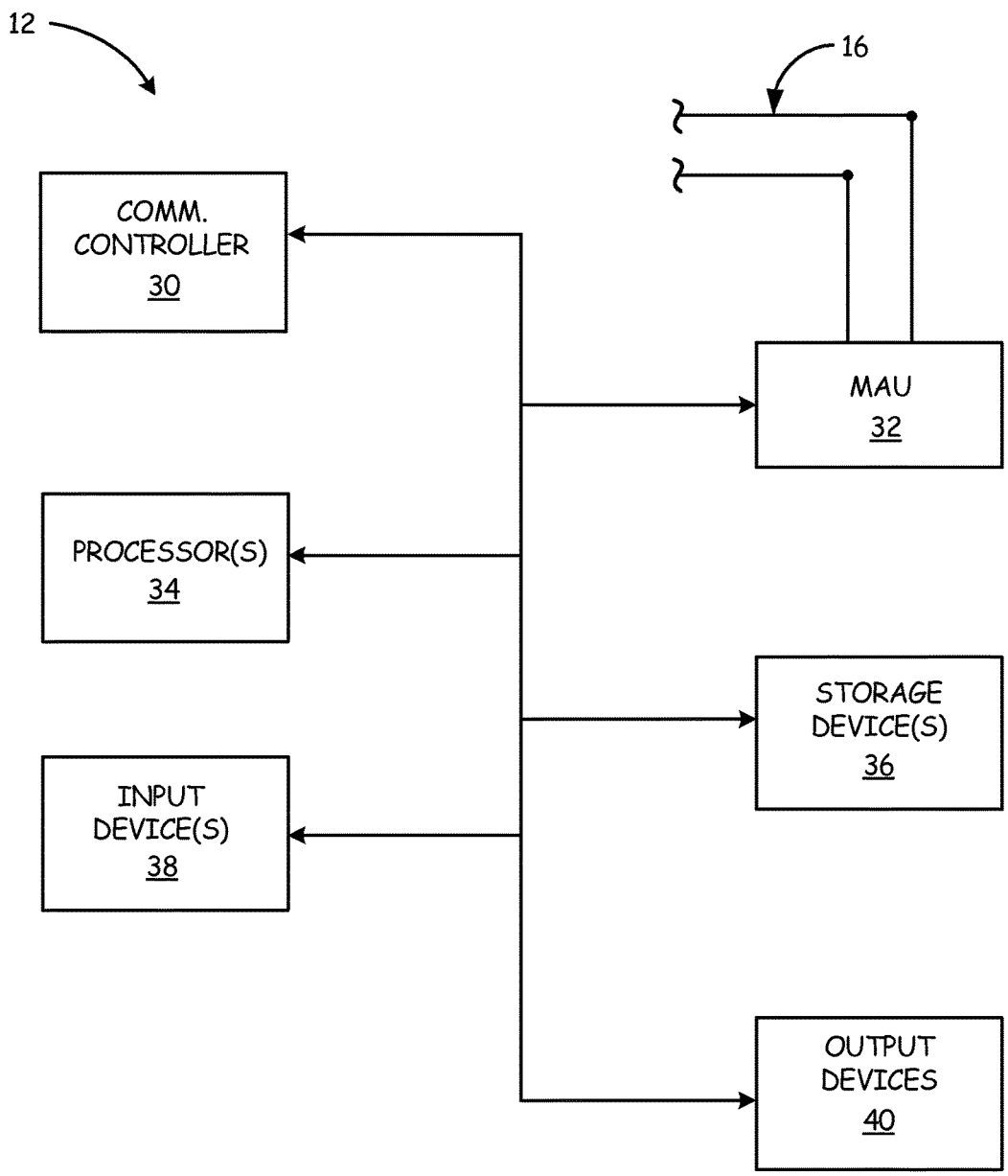
FIG. 3 is a block diagram of a host device.

FIG. 3 is a block diagram of one embodiment of host device 12 of FIG. 1. As illustrated, the overall architecture of host device 12 can be similar to that of field devices 14, and includes communications controller 30, MAU 32, processor(s) 34, storage device(s) 36, input device(s) 38, and output device(s) 40. Each of communications controller 30, MAU 32, processor 34, and storage device 36 can be substantially similar to communications controller 18, MAU 20, processor 22, and storage device 24 of field device 14A, respectively. For example, communications controller 30 can serve as an interface between processor 34 and MAU 32 for sending and receiving message data over bus 16. In addition, storage device 36 can be described as a computer-readable storage medium encoded with instructions which, when executed by processor 34, cause host device 12 to operate in accordance with techniques described herein.

As illustrated in FIG. 3, host device 12 can further include input device(s) 38 and output device(s) 40. Input device 38, in some examples, is configured to receive input from a user. Examples of input device 38 can include any one or more of a mouse, a keyboard, a microphone, a presence-sensitive and/or touch-sensitive display, or other type of device configured to receive input from a user. Output device 40 can be configured to provide output to a user. Examples of output device 40 can include a sound card, a video graphics card, a speaker, a light emitting diode (LED), a display device such as a cathode ray tube (CRT) monitor or liquid crystal display (LCD), or other type of device for outputting information in a form understandable to users or machines.

In some examples, storage device 40 can be encoded with instructions which, when executed by processor 34, cause processor 34 to execute a user interface (UI) application configured to allow user interaction with one or more devices connected to network 10. For example, host device 12 can execute a UI application that accepts input via input device 38, such as input to identify one or more of field devices 14 and data to be uploaded to or downloaded from the identified one or more of field devices 14. For instance, host device 12 can execute a UI application that accepts input to cause host device 12 to initiate a data upload and/or download with one or more of field devices 14 via a fast data communications protocol, as is further described below.

Figure 4:
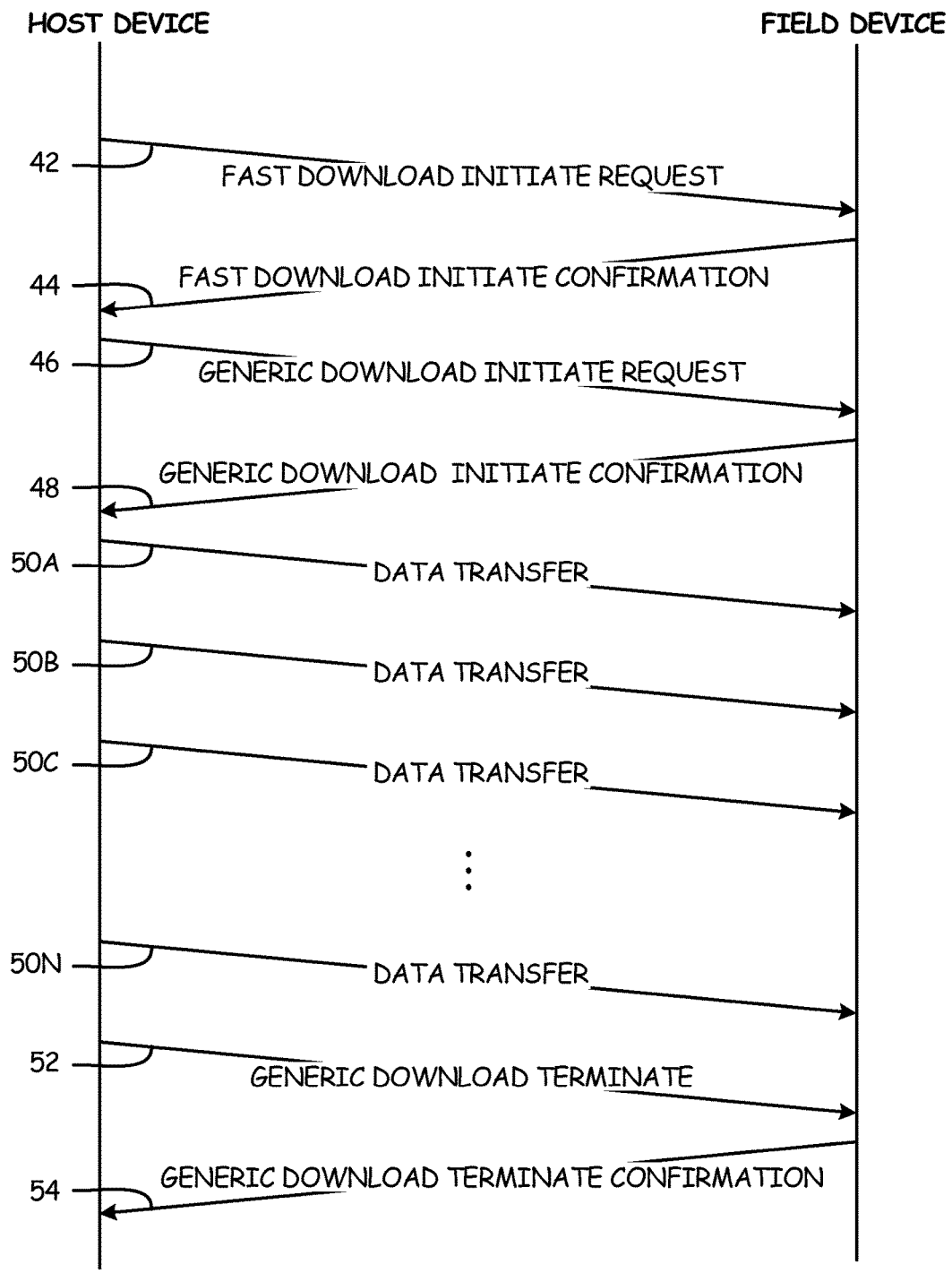
FIG. 4 is a sequence diagram illustrating a fast data download from a host device to a field device.

FIG. 4 is a sequence diagram illustrating example operations of a fast data download from host device 12 to field device 14A. While the example operations are illustrated and described with respect to a fast data download from host device 12 to field device 14A, the example operations can be applicable to fast data downloads from host device 12 to any one or more of field devices 14.

Host device 12 can transmit a fast data transfer initiate request to field device 14A to request a subsequent data transfer between host device 12 and field device 14A via a fast data transfer communication protocol (42). For instance, host device 12 can transmit the fast data transfer initiate request in response to receiving an input (e.g., user input via a UI application) to download configuration data and/or software image data to field device 14A. In some examples, host device 12 can transmit the fast data initiate request via a connection-based VCR established between host device 12 and field device 14A. In certain examples, the fast data transfer initiate request can include an indication of a requested data rate of the subsequent data transfer.

Field device 14A, responsive to receiving the fast data transfer initiate request, can transmit a fast data transfer confirmation to host device 12 indicating that field device 14A is configured for the subsequent data transfer via the fast data transfer communication protocol (44). In some examples, field device 14A can transmit the fast data transfer confirmation via the VCR established between host device 12 and field device 14A. In certain examples, such as when the fast data transfer initiate request received from host device 12 includes an indication of a requested data rate of the subsequent data transfer, the fast data transfer confirmation can include one or more of a confirmation of the requested data rate or an indication of a second requested data rate, different than the requested data rate received from host device 12. In this way, field device 14A and host device 12 can negotiate a data rate for the subsequent data transfer via the fast download initiate request and the fast download initiate confirmation.

Host device 12, responsive to receiving the fast data transfer confirmation, can transmit a generic data transfer initiate request to field device 14A to request the subsequent data transfer with field device 14A (46). In certain examples, host device 12 may not receive the fast data transfer confirmation from field device 14A. In such examples, host device 12 may retransmit the fast data transfer initiate request to field device 14A a threshold number of times or until host device 12 receives a fast data transfer confirmation message. The threshold number of retransmits can range from zero (in which case host device 12 does not retransmit the request) to any non-zero number, such as one, two, or more retransmits. If host device 12 does not receive the fast data transfer confirmation message, host device 12 can execute the subsequent data transfer via a plurality of FMS messages over the VCR, thereby helping to ensure interoperability of field devices and/or host devices operable to execute the fast data transfer protocol within networks that include field devices and/or host devices that are not operable to execute the fast data transfer protocol.

The generic download initiate request can be a data transfer message defined by the FMS and transmitted via the VCR established between host device 12 and field device 14A. The generic download initiate request can, in certain examples, include an indication of a category of data to be downloaded via the subsequent data transfer (e.g., configuration data, software image data, or other category of data). As in the example of FIG. 4, the fast download initiate request and the generic download initiate request can be transmitted by host device 12 via separate messages. In other examples, the fast download initiate request and the generic download initiate request can be transmitted via a single message. For instance, the fast download initiate request can be appended to the generic download initiate request defined by the FMS. One or more of the fast download initiate request and the generic download initiate request can include a broadcast network address to which a plurality of messages will be broadcast during the subsequent data transfer.

Field device 14A can transmit, responsive to receiving the generic download initiate request, a generic download initiate confirmation to host device 12 (48), such as via the VCR between host device 12 and field device 14A. In addition, field device 14A can configure a communications interface (e.g., a port of MAU 20) to receive the subsequent data transfer at the broadcast network address associated with the subsequent data transfer.

In response to receiving the generic download initiate confirmation, host device 12 can initiate the subsequent data transfer with field device 14A via the fast data transfer communication protocol (e.g., a connectionless broadcasting protocol). For example, as illustrated in FIG. 4, host device 12 can execute the subsequent data transfer by broadcasting the subsequent data transfer via a plurality of broadcast messages (50A-50N, collectively referred to herein as "broadcast messages 50"), such as to a broadcast network address included in one or more of the fast data transfer initiate request or the generic data transfer initiate request. Each of the plurality of broadcast messages 50 can include a portion of data associated with the subsequent data transfer. For instance, such as when the subsequent data transfer includes a software image to be loaded and/or executed by field device 14A, each of broadcast messages 50 can include a portion of the software image. Host device 12 can transmit broadcast messages 50 until the subsequent data transfer is complete. Accordingly, broadcast messages 50 are illustrated as including "N" broadcast messages, where "N" is an arbitrary number. In addition, in some examples, host device 12 can configure a maximum token hold time parameter of field device 14A to extend the time of unscheduled communications allotted to field device 14A. For instance, host device 12 can transmit a message (e.g., a message defined by the FMS to configure the token hold time) prior to transmitting broadcast messages 50. In this way, host device 12 can help to decrease the total time over which the subsequent data transfer operates by helping to ensure that the entire subsequent data transfer occurs within a single unscheduled communications window.

Host device 12 can transmit broadcast messages 50 consecutively to field device 14 without receiving acknowledgment from field device 14 that any one or more of broadcast messages 50 were received by field device 14. In this way, host device 12 can help to decrease the amount of time over which the subsequent data transfer operates by reducing the messaging overhead and time associated with acknowledgment messages. In certain examples, each of broadcast messages 50 can include data positioning information that indicates a relative position of the data included in the respective broadcast message within the data associated with the subsequent data transfer. The data positioning information can include a beginning and/or ending memory address of data within the respective broadcast message. In certain examples, the data positioning information can include an indication of a sequential order of broadcast messages, such as an integer value representing the relative order of a particular broadcast message within the plurality of broadcast messages 50. As such, each of broadcast messages 50 can include data positioning information indicating a relative position of the associated data within the subsequent data transfer. Accordingly, in certain examples, field device 14A can compare the data positioning information received in broadcast messages 50 to determine whether any one or more of broadcast messages 50 was not received by field device 14A.

As one example, field device 14A can compare data positioning information included in broadcast message 50C with data positioning information included in broadcast message 50A to determine that data associated with broadcast message 50B was not received by field device 14A. In such examples, field device 14A can transmit a retransmit request to host device 12 indicating a request that host device 12 retransmit the portion of the data associated with the subsequent data transfer that was included in broadcast message 50B. Host device 12 can retransmit the requested broadcast message (e.g., broadcast message 50B) in response to receiving the retransmit request.

Host device 12 can transmit a generic download terminate request to field device 14A to indicate that the subsequent data transfer is complete (52). In some examples, the generic download terminate message can be transmitted via the VCR established between host device 12 and field device 14A. Field device 14A can transmit (e.g., via the VCR) a generic download terminate confirmation to host device 12 responsive to receiving the generic download terminate request (54).

Accordingly, host device 12 and field device 14A (or any one or more of field devices 14) can execute a fast data transfer communication protocol to download data, such as configuration data and/or software image data, from host device 12 to field device 14A. The described fast data download can increase the speed and efficiency of data downloads from host device 12 to field devices 14, thereby increasing usability of network 10 to monitor and/or control the industrial process.

Figure 5:
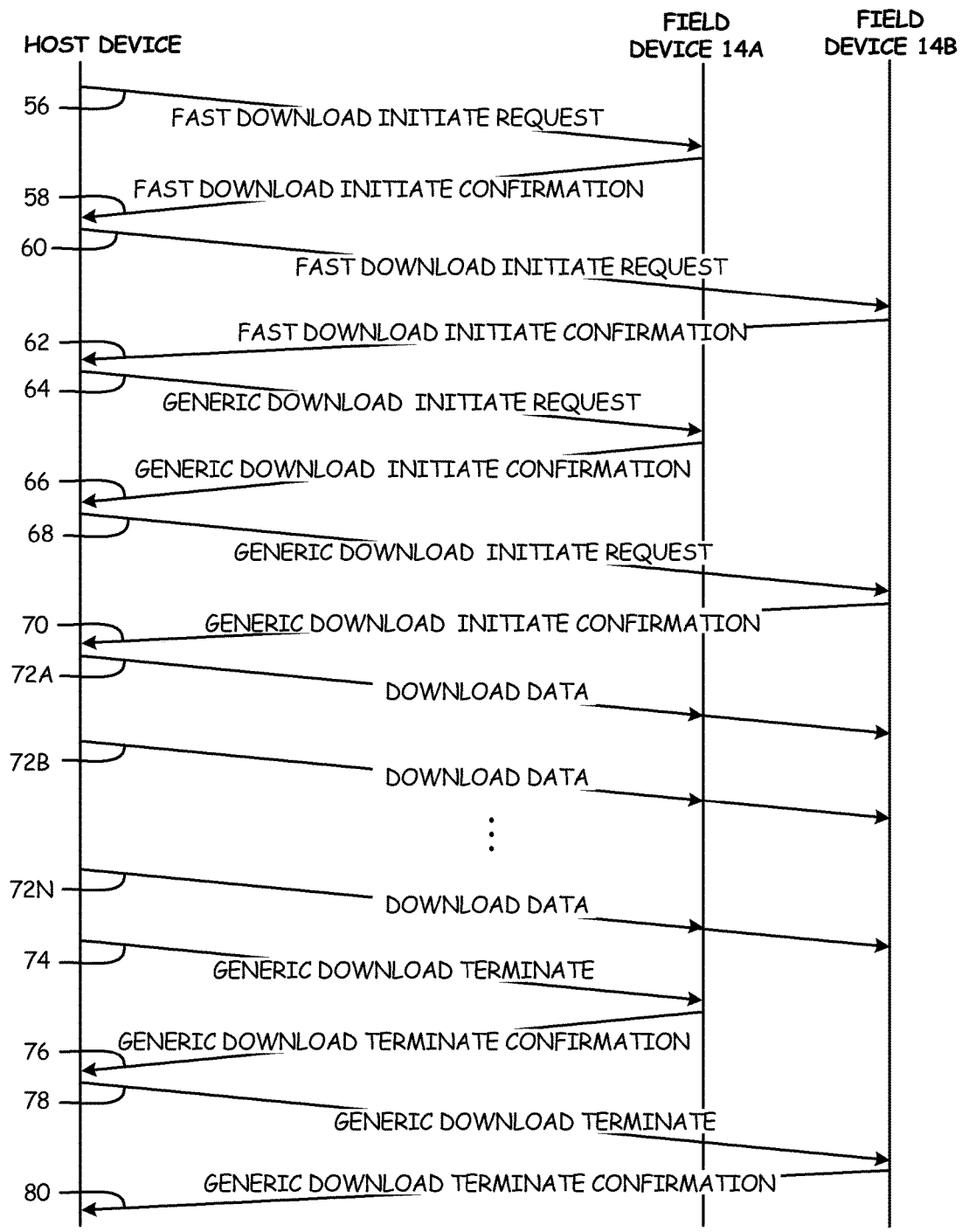
FIG. 5 is a sequence diagram illustrating a fast data download from a host device to multiple field devices.

FIG. 5 is a sequence diagram illustrating example operations of a fast data download from host device 12 to field devices 14A and 14B. As illustrated in FIG. 5, host device 12 can execute a fast data transfer communication protocol to broadcast a subsequent data transfer to a plurality of field devices 14. While illustrated and described with respect to a subsequent data transfer between host device 12 and two of field devices 14 (i.e., field device 14A and field device 14B), the example operations can be applicable to subsequent data transfers between host device 12 and any number of field devices 14 (e.g., each of field devices 14).

As illustrated, the example operations of FIG. 5 to execute a fast data download from host device 12 to multiple field devices 14 can be similar in nature to the example operations of FIG. 4 to execute the fast data download from host device 12 to a single one of field devices 14. In general, the example operations of FIG. 5 extend the fast data download to multiple field devices 14 via separate initiation and termination requests to each of the multiple field devices.

As illustrated in FIG. 5, host device 12 can transmit a fast data transfer initiate request to request a subsequent data transfer between host device 12 and field device 14A via a fast data transfer communication protocol (56). Responsive to receiving the fast data transfer initiate request, field device 14A can transmit a fast data transfer confirmation indicating that field device 14A is configured for the subsequent data transfer via the fast data transfer communication protocol (58). Host device 12 can further transmit a fast data transfer initiate request to field device 14B to request the subsequent data transfer between host device 12 and field device 14B (60). Responsive to receiving the fast data transfer initiate request, field device 14B can transmit a fast data transfer confirmation indicating that field device 14B is configured for the subsequent data transfer via the fast data transfer communication protocol (62).

Host device 12 can transmit a generic data transfer initiate request to field device 14A (64), which can responsively transmit a generic data transfer confirmation message to host device 12 (66). Host device 12 can transmit a generic data transfer initiate request to field device 14B (68). Field device 14B can transmit a generic data transfer confirmation message to host device 12 to indicate that field device 14B is configured for the subsequent data transfer (70). One or more of fast data transfer initiate request 56 and generic data transfer initiate request 64 to field device 14A can include a broadcast network address to which a plurality of messages will be broadcast during the subsequent data transfer. In addition, one or more of fast data transfer initiate request 60 and generic data transfer initiate request 68 to field device 14B can include the same broadcast network address to which the plurality of messages will be broadcast. Accordingly, host device 12 can execute the subsequent data transfer by broadcasting the subsequent data transfer via a plurality of broadcast messages (72A-72N, collectively referred to herein as "broadcast messages 72"). As illustrated, broadcast messages 72 can be received by both field device 14A and field device 14B. In this way, rather than transmit separate messages to each of field devices 14A and 14B, host device 12 can execute the subsequent data transfer with both field device 14A and field device 14B via a same set of broadcast messages 72, thereby decreasing the amount of network traffic and execution time associated with the subsequent data transfer.

As further illustrated in FIG. 5, host device 12 can terminate the subsequent data transfer by transmitting a generic download terminate request to field device 14A (74), receiving a corresponding generic download terminate confirmation from field device 14A (76), transmitting a generic download terminate request to field device 14B (78), and receiving a corresponding generic download terminate confirmation from field device 14B (80).

Figure 6:
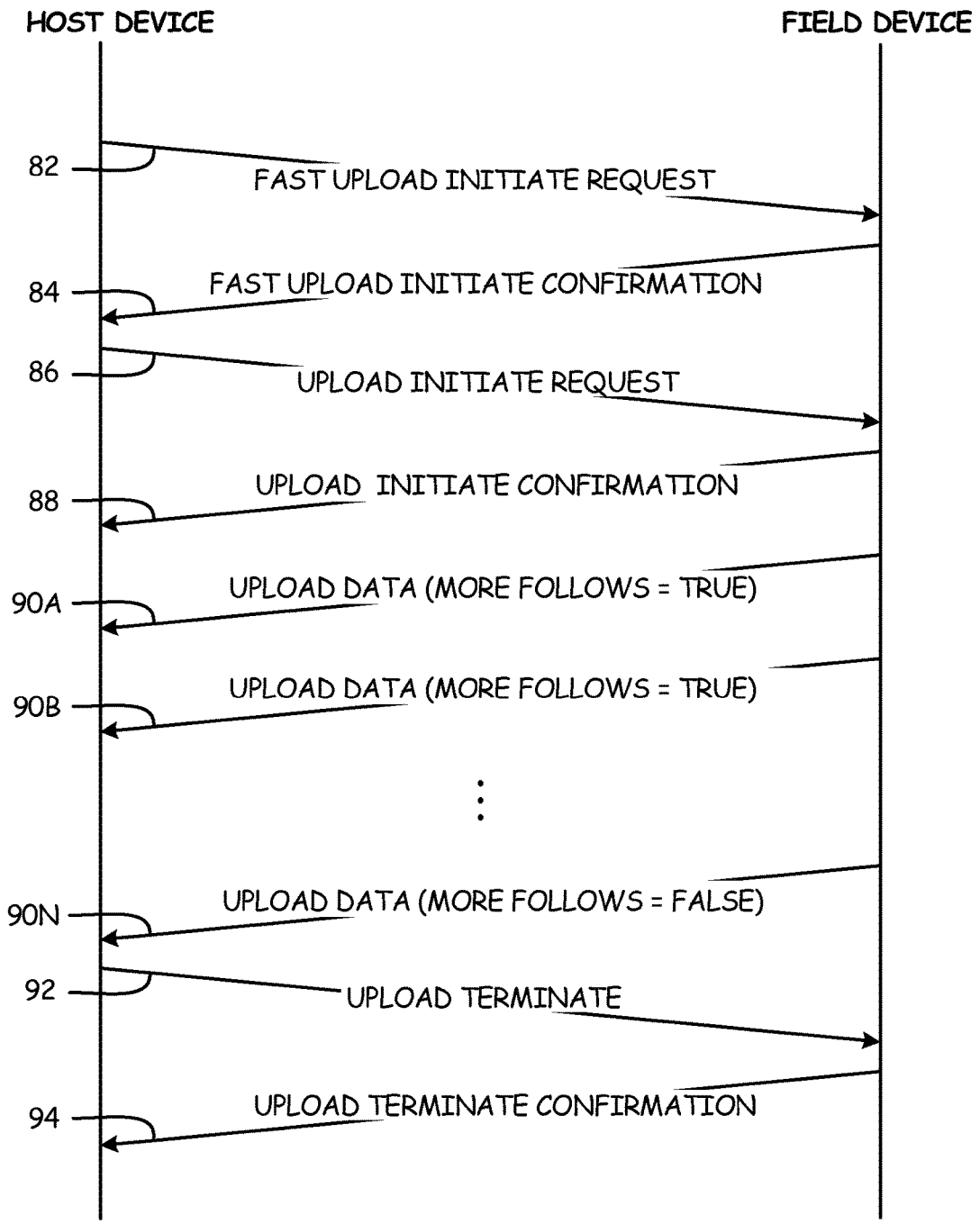
FIG. 6 is a sequence diagram illustrating a fast data upload from a field device to a host device.

FIG. 6 is a sequence diagram illustrating example operations of a fast data upload from field device 14A to host device 12. As illustrated in FIG. 6, host device 12 can initiate an upload of data (e.g., configuration data, status data, software image data, or other types of data) via a fast data transfer communication protocol. While described with respect to field device 14A, the example operations can be applicable to any of field devices 14.

Host device 12 can transmit a fast upload initiate request to field device 14A to request a subsequent data upload from field device 14A to host device 12 via a fast data transfer communication protocol (82). In some examples, the fast upload initiate request can be transmitted via a connection-based VCR between host device 12 and field device 14A. Field device 14A, responsive to receiving the fast upload initiate request, can transmit (e.g., via the VCR) a fast upload initiate confirmation indicating that field device 14A is configured for the subsequent data upload via the fast data transfer communication protocol (84). In response to receiving the fast upload initiate confirmation, host device 12 can transmit an upload initiate request (86), which in certain examples can be a FMS message sent via the VCR and configured to initiate a data upload. In certain examples, the upload initiate request can be considered a generic upload initiate request. Field device 14A can transmit an upload initiate confirmation (e.g., via the VCR) indicating that field device 14A is configured for the subsequent data upload (88). In some examples, the upload initiate confirmation can be considered a generic upload initiate confirmation. One or more of the fast upload initiate request 82 and the upload initiate request 86 can include an indication of a broadcast network address at which host device 12 is configured to receive the subsequent data upload. Field device 14A can execute the subsequent data upload via a plurality of broadcast messages (90A-90N, collectively referred to herein as "broadcast messages 90") transmitted to the broadcast network address identified in fast data upload initiate request 82 and/or upload initiate request 86.

Field device 14A can transmit broadcast messages 90 sequentially without receiving an acknowledgment that host device 12 has received any one or more of broadcast messages 90. In some examples, each of broadcast messages 90 can include data positioning information indicating a relative position of data associated with a broadcast message within the data associated with the subsequent data upload. Host device 12 can compare the received data positioning information to determine whether any one or more of broadcast messages 90 was not received by host device 12. Host device 12 can send a retransmit request to field device 14A in response to determining that a broadcast message was not received, the retransmit request including an indication of the determined one of broadcast messages 90 that was not received by host device 12.

Each of broadcast messages 90 can include an indication of whether the broadcast message is last in the sequence of broadcast messages 90. For instance, as illustrated, broadcast message 90N can include an indication (e.g., a bit or byte) that broadcast message 90N is last in the sequence of broadcast messages, and others of broadcast messages 90 can include an indication that they are not the last in sequence.

Responsive to receiving a last in sequence of broadcast messages 90, host device 12 can terminate the subsequent data upload by transmitting an upload terminate request to field device 14A (92), which can transmit an upload terminate confirmation in response (94).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of transferring data between a host device and a field device on an industrial process network, the method comprising:
   transmitting, by the host device to the field device, a fast data transfer initiate request via a first initiate message to request a subsequent data transfer between the host device and the field device via a fast data transfer communication protocol, the fast data transfer initiate request comprising a fast upload initiate request to request that the field device broadcast the subsequent data from the field device to a broadcast address via the fast data transfer communication protocol;
   receiving, by the host device from the field device, a fast data transfer confirmation via a first confirmation message indicating that the field device is configured for the subsequent data transfer via the fast data transfer communication protocol;
   transmitting, by the host device to the field device, a generic data transfer initiate request via a second initiate message to request the subsequent data transfer with the field device;
   receiving, by the host device from the field device, a generic data transfer initiate confirmation via a second confirmation message indicating that the field device is configured for the subsequent data transfer; and
   executing, responsive to the generic data transfer initiate confirmation, the subsequent data transfer between the host device and the field device via the fast data transfer protocol;
   wherein one or more of the fast data transfer initiate request and the generic data transfer initiate request includes a broadcast network address;
   wherein executing the subsequent data transfer between the host device and the field device comprises broadcasting, by the field device, the subsequent data transfer to the broadcast network address and receiving, by the host device, the subsequent data transfer via the fast download communication protocol via a plurality of broadcast messages, each of the plurality of broadcast messages including a portion of data associated with the subsequent data transfer;
   wherein each of the plurality of broadcast messages includes data positioning information that indicates a relative position, within the data associated with the subsequent data transfer, of the portion of the data included in the respective broadcast message;
   wherein the plurality of broadcast messages includes at least a first broadcast message and a second broadcast message, the second broadcast message received subsequent to the first broadcast message; and
   wherein the method further comprises:
      comparing, by the host device, data positioning information included in the first broadcast message to data positioning information included in the second broadcast message; and
      determining, by the host device based on the comparing, that a portion of the data associated with the subsequent data transfer was not received by the host device;
      wherein executing the subsequent data transfer further comprises transmitting, by the host device to the field device, a retransmit request indicating a request that the field device retransmit the portion of the data to the broadcast network address via a third broadcast message, subsequent to the second broadcast message.

2. The method of claim 1,
   wherein transmitting the fast data transfer initiate request, receiving the fast data transfer initiate confirmation, transmitting the generic data transfer initiate request, and receiving the generic data transfer initiate confirmation are performed via a connection-oriented communication session between the host device and the field device, and
   wherein executing the subsequent data transfer between the host device and the field device comprises broadcasting the subsequent data transfer via a connectionless communication protocol.

3. The method of claim 1, wherein executing the subsequent data transfer between the host device and the field device comprises executing the subsequent data transfer at a data rate determined, at least in part, by the field device.

4. A method of transferring data between a host device and a field device on an industrial process network, the method comprising:
receiving, by the field device from the host device, a fast data transfer initiate request via a first initiate message to request a subsequent data transfer between the host device and the field device via a fast data transfer communication protocol;
transmitting, by the field device to the host device, a fast data transfer initiate confirmation via a first confirmation message indicating that the field device is configured for the subsequent data transfer via the fast data transfer communication protocol;
receiving, by the field device from the host device, a generic data transfer initiate request via a second initiate message to request the subsequent data transfer with the field device;
transmitting, by the field device to the host device, a generic data transfer initiate confirmation via a second confirmation message indicating that the field device is configured for the subsequent data transfer; and
executing, responsive to the generic data transfer initiate confirmation, the subsequent data transfer between the host device and the field device via the fast data transfer communication protocol;
wherein one or more of the fast data transfer initiate request and the generic data transfer initiate request includes a broadcast network address;
wherein executing the subsequent data transfer between the host device and the field device comprises broadcasting the subsequent data transfer to the broadcast network address via a plurality of broadcast messages using the fast data transfer communication protocol;
wherein each of the plurality of broadcast messages includes:
a portion of data associated with the subsequent data transfer; and
data positioning information that indicates a relative position, within the data associated with the subsequent data transfer, of the portion of the data included in the respective broadcast message;
wherein the plurality of broadcast messages includes at least a first broadcast message and a second broadcast message, the second broadcast message received subsequent to the first broadcast message; and
wherein the method further comprises:
comparing, by the field device, data positioning information included in the first broadcast message to data positioning information included in the second broadcast message; and
determining, by the field device based on the comparing, that a portion of the data associated with the subsequent data transfer was not received by the field device;
wherein executing the subsequent data transfer further comprises transmitting, by the field device to the host device, a retransmit request indicating a request that the host device retransmit the portion of the data to the broadcast network address via a third broadcast message, subsequent to the second broadcast message.

5. The method of claim 4,
wherein the fast data transfer initiate request comprises a fast download initiate request to request that the field device receive the subsequent data transfer from the host device via the fast data transfer communication protocol, and
wherein executing the subsequent data transfer comprises receiving, by the field device, the subsequent data transfer at the broadcast network address via the plurality of broadcast messages.

6. The method of claim 4, further comprising:
storing, by the field device, the data included in a respective broadcast message at a domain location of non-volatile memory of the field device, the domain location corresponding to the data positioning information included within the respective broadcast message.

7. The method of claim 4, wherein the field device comprises a first field device, wherein the fast data transfer initiate request comprises a first fast data transfer initiate request, wherein the fast data transfer initiate confirmation comprises a first fast data transfer initiate confirmation, wherein the generic data transfer initiate request comprises a first generic data transfer initiate request, and wherein the generic data transfer initiate confirmation comprises a first generic data transfer initiate confirmation, the method further comprising:
receiving, by a second field device from the host device, a second fast data transfer initiate request to request the subsequent data transfer between the host device and the second field device via the fast download communication protocol;
transmitting, by the second field device to the host device, a second fast data transfer initiate confirmation indicating that the second field device is configured for the subsequent data transfer via the fast download communication protocol;
receiving, by the second field device from the host device, a second generic data transfer initiate request to request the subsequent data transfer with the second field device;
transmitting, by the second field device to the host device, a second generic data transfer initiate confirmation indicating that the second field device is configured for the subsequent data transfer; and
executing the subsequent data transfer between the host device and the second field device via the fast download communication protocol.

8. The method of claim 4,
wherein receiving the fast data transfer initiate request, transmitting the fast data transfer initiate confirmation, receiving the generic data transfer initiate request, and transmitting the generic data transfer initiate confirmation are performed via a connection-oriented communication session between the host device and the field device, and
wherein executing the subsequent data transfer between the host device and the field device comprises broadcasting the subsequent data transfer via a connectionless communication protocol.

9. The method of claim 4, further comprising:
negotiating, by the field device with the host device, a data transfer rate of the subsequent data transfer, wherein executing the subsequent data transfer between the host device and the field device comprises executing the subsequent data transfer at the negotiated data transfer rate.

10. The method of claim 4, further comprising:
transmitting, by the field device to the host device, a data transfer halt message requesting that the host device halt the subsequent data transfer; and
transmitting, by the field device subsequent to transmitting the data transfer halt message, a data transfer commence message to the host device requesting that the host device commence the subsequent data transfer.

11. A field device comprising:
at least one processor;
one or more storage devices; and
a transceiver configured to send and receive data over an industrial process network,
wherein the one or more storage devices are encoded with instructions that, when executed by the at least one processor, cause the field device to:
receive, from the host device via the transceiver, a fast data transfer initiate request via a first initiate message to request a subsequent data transfer between the host device and the field device via a fast data transfer communication protocol;
transmit, to the host device via the transceiver, a fast data transfer initiate confirmation via a first confirmation message indicating that the field device is configured for the subsequent data transfer via the fast data transfer communication protocol;
receive, from the host device via the transceiver, a generic data transfer initiate request via a second initiate message to request the subsequent data transfer with the field device;
transmit, to the host device via the transceiver, a generic data transfer initiate confirmation via a second confirmation message indicating that the field device is configured for the subsequent data transfer; and
execute, responsive to transmitting the generic data transfer initiate confirmation, the subsequent data transfer between the host device and the field device via the fast data transfer communication protocol;
wherein one or more of the fast data transfer initiate request and the generic data transfer initiate request includes a broadcast network address; and
wherein executing the subsequent data transfer between the host device and the field device comprises broadcasting the subsequent data transfer to the broadcast network address via the fast download communication protocol;
wherein each of the plurality of broadcast messages includes:
a portion of data associated with the subsequent data transfer; and
data positioning information that indicates a relative position, within the data associated with the subsequent data transfer, of the portion of the data included in the respective broadcast message;
wherein the plurality of broadcast messages includes at least a first broadcast message and a second broadcast message, the second broadcast message received subsequent to the first broadcast message; and
wherein the one or more storage devices are further encoded with instructions that, when executed by the at least one processor, cause the field device to:
compare data positioning information included in the first broadcast message to data positioning information included in the second broadcast message; and
determine, based on the comparing, that a portion of the data associated with the subsequent data transfer was not received by the field device;
wherein executing the subsequent data transfer further comprises transmitting, by the field device to the host device, a retransmit request indicating a request that the host device retransmit the portion of the data to the broadcast network address via a third broadcast message, subsequent to the second broadcast message.

12. A method of transferring data between a host device and a field device on an industrial process network, the method comprising:
receiving, by the field device from the host device, a fast data transfer initiate request via a first initiate message to request a subsequent data transfer between the host device and the field device via a fast data transfer communication protocol, the fast data transfer initiate request comprising a fast upload initiate request to request that the field device broadcast the subsequent data transfer to the host device via the fast data transfer communication protocol;
transmitting, by the field device to the host device, a fast data transfer initiate confirmation via a first confirmation message indicating that the field device is configured for the subsequent data transfer via the fast data transfer communication protocol;
receiving, by the field device from the host device, a generic data transfer initiate request via a second initiate message to request the subsequent data transfer with the field device;
transmitting, by the field device to the host device, a generic data transfer initiate confirmation via a second confirmation message indicating that the field device is configured for the subsequent data transfer; and
executing, responsive to the generic data transfer initiate confirmation, the subsequent data transfer between the host device and the field device via the fast data transfer communication protocol;
wherein one or more of the fast data transfer initiate request and the generic data transfer initiate request includes a broadcast network address;
wherein executing the subsequent data transfer between the host device and the field device comprises broadcasting, by the field device, the subsequent data transfer to the broadcast network address via a plurality of broadcast messages using the fast data transfer communication protocol;
wherein each of the plurality of broadcast messages includes:
a portion of data associated with the subsequent data transfer; and
data positioning information that indicates a relative position, within the data associated with the subsequent data transfer, of the portion of the data included in the respective broadcast message;
wherein the plurality of broadcast messages includes at least a first broadcast message and a second broadcast message;
wherein the second broadcast message is transmitted by the field device subsequent to transmitting the first broadcast message and without receiving an acknowledgment from the host device that includes an indication of whether the host device received the first broadcast message; and
wherein executing the subsequent data transfer further comprises:

receiving, by the field device subsequent to transmitting the second broadcast message, a retransmit request from the host device indicating a request that the field device retransmit the portion of the data associated with the subsequent data transfer that was included in the first broadcast message; and broadcasting, by the field device to the broadcast network address, a third broadcast message subsequent to transmitting the second broadcast message, the third broadcast message including the portion of the data associated with the subsequent data transfer that was included in the first broadcast message.

13. A field device comprising:

at least one processor;

one or more storage devices; and a transceiver configured to send and receive data over an industrial process network, wherein the one or more storage devices are encoded with instructions that, when executed by the at least one processor, cause the field device to:

receive, from the host device via the transceiver, a fast data transfer initiate request via a first initiate message to request a subsequent data transfer between the host device and the field device via a fast data transfer communication protocol, the fast data transfer initiate request comprising a fast upload initiate request to request that the field device broadcast the subsequent data transfer to the host device via the fast data transfer communication protocol;

transmit, to the host device via the transceiver, a fast data transfer initiate confirmation via a first confirmation message indicating that the field device is configured for the subsequent data transfer via the fast data transfer communication protocol;

receive, from the host device via the transceiver, a generic data transfer initiate request via a second initiate message to request the subsequent data transfer with the field device;

transmit, to the host device via the transceiver, a generic data transfer initiate confirmation via a second confirmation message indicating that the field device is configured for the subsequent data transfer; and execute, responsive to transmitting the generic data transfer initiate confirmation, the subsequent data transfer between the host device and the field device via the fast data transfer communication protocol;

wherein one or more of the fast data transfer initiate request and the generic data transfer initiate request includes a broadcast network address; and wherein executing the subsequent data transfer between the host device and the field device comprises broadcasting, by the field device, the subsequent data transfer to the broadcast network address via a plurality of broadcast messages using the fast data transfer communication protocol;

wherein each of the plurality of broadcast messages includes:

a portion of data associated with the subsequent data transfer; and data positioning information that indicates a relative position, within the data associated with the subsequent data transfer, of the portion of the data included in the respective broadcast message;

wherein the plurality of broadcast messages includes at least a first broadcast message and a second broadcast message;

wherein the second broadcast message is transmitted by the field device subsequent to transmitting the first broadcast message and without receiving an acknowledgment from the host device that includes an indication of whether the host device received the first broadcast message; and wherein the one or more storage devices are further encoded with instructions that, when executed by the at least one processor, cause the field device to:

receive, subsequent to transmitting the second broadcast message, a retransmit request from the host device indicating a request that the field device retransmit the portion of the data associated with the subsequent data transfer that was included in the first broadcast message; and broadcast, to the broadcast network address, a third broadcast message subsequent to transmitting the second broadcast message, the third broadcast message including the portion of the data associated with the subsequent data transfer that was included in the first broadcast message.

\* \* \* \* \*